(12) United States Patent
Jeon et al.

(10) Patent No.: US 12,249,003 B2
(45) Date of Patent: Mar. 11, 2025

(54) DEVICE AND METHOD WITH DATA PREPROCESSING

(71) Applicants: SAMSUNG ELECTRONICS CO., LTD., Suwon-si (KR); UNIST(ULSAN NATIONAL INSTITUTE OF SCIENCE AND TECHNOLOGY), Ulsan (KR)

(72) Inventors: Myeongjae Jeon, Ulsan (KR); Chanho Park, Ulsan (KR); Kyuho Lee, Ulsan (KR)

(73) Assignees: Samsung Electronics Co., Ltd., Suwon-si (KR); UNIST(ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 397 days.

(21) Appl. No.: 17/558,686

(22) Filed: Dec. 22, 2021

(65) Prior Publication Data
US 2022/0398685 A1    Dec. 15, 2022

(30) Foreign Application Priority Data
Jun. 9, 2021  (KR) .......................... 10-2021-0074809

(51) Int. Cl.
*G06T 1/20*   (2006.01)
*G06N 20/00*  (2019.01)

(52) U.S. Cl.
CPC .............. *G06T 1/20* (2013.01); *G06N 20/00* (2019.01)

(58) Field of Classification Search
None
See application file for complete search history.

(56) References Cited

U.S. PATENT DOCUMENTS 7,328,335 B1 * 2/2008 Sundararajan ... H03K 19/17768
                                                 713/1
9,542,760 B1 * 1/2017 Hu .................... H04N 19/436
(Continued)

FOREIGN PATENT DOCUMENTS

KR      10-1705768 B1      2/2017
KR   10-2020-0068050 A     6/2020
(Continued)

OTHER PUBLICATIONS

Wang, et al. "A Systematic Methodology for Analysis of Deep Learning Hardware and Software Platforms." *Proceedings of the 3rd MLSys Conference*. 2020. pp. 1-14.
(Continued)

*Primary Examiner* — Siamak Harandi
*Assistant Examiner* — Caroline Tabancay Duffy
(74) *Attorney, Agent, or Firm* — NSIP Law

(57) ABSTRACT

A device and method with data preprocessing are disclosed. The device with preprocessing includes a first memory configured to store raw data, and a field programmable gate array (FPGA) in which reconfigurable augmentation modules are programmed, where the FPGA includes a decoder configured to decode the raw data, a second memory configured to store the decoded raw data, and a processor, where the processor is configured to determine target augmentation modules, from among the reconfigurable augmentation modules, based on a data preprocessing pipeline, perform the data preprocessing pipeline using the determined target augmentation modules to generate augmented data, including an augmentation of at least a portion of the decoded raw data stored in the second memory using an idle augmentation module, from among the target augmentation modules, and implement provision of the augmented data to a graphics processing unit (GPU) or Neural Processing Unit (NPU).

23 Claims, 9 Drawing Sheets

(56) References Cited

U.S. PATENT DOCUMENTS

| | | | |
|---|---|---|---|
| 10,229,470 B2 | 3/2019 | Benthin et al. | |
| 10,360,832 B2* | 7/2019 | Ozguner | G06T 1/20 |
| 2014/0267318 A1* | 9/2014 | Lum | G06T 15/005 |
| | | | 345/506 |
| 2019/0311254 A1* | 10/2019 | Turek | G06N 3/08 |
| 2019/0370084 A1 | 12/2019 | Behar et al. | |
| 2020/0394772 A1 | 12/2020 | Afra | |
| 2021/0224511 A1* | 7/2021 | Guo | G06V 40/168 |
| 2021/0383241 A1* | 12/2021 | Karras | G06N 20/00 |
| 2023/0105476 A1* | 4/2023 | Anil | G06N 3/006 |
| | | | 718/102 |

FOREIGN PATENT DOCUMENTS

| | | |
|---|---|---|
| KR | 10-2128472 B1 | 6/2020 |
| KR | 10-2020-0078331 A | 7/2020 |
| KR | 10-2020-0113991 A | 10/2020 |

OTHER PUBLICATIONS

Huang, Gao, et al. "Densely connected convolutional networks." *Proceedings of the IEEE conference on computer vision and pattern recognition*. 2017. pp. 4700-4708.

Park, Pyeongsu, Heetaek Jeong, and Jangwoo Kim. "TrainBox: An Extreme-Scale Neural Network Training Server Architecture by Systematically Balancing Operations." *2020 53rd Annual IEEE/ACM International Symposium on Microarchitecture (MICRO)*. IEEE, 2020. pp. 825-838.

\* cited by examiner

DEVICE AND METHOD WITH DATA PREPROCESSING

CROSS-REFERENCE TO RELATED APPLICATIONS

This application claims the benefit under 35 USC § 119(a) of Korean Patent Application No. 10-2021-0074809, filed on Jun. 9, 2021, in the Korean Intellectual Property Office, the entire disclosure of which is incorporated herein by reference for all purposes.

BACKGROUND

1. Field

The following description relates to a device and method with data preprocessing.

2. Description of Related Art

According to a study entitled "Systematic Methodology for Analysis of Deep Learning Hardware and Software Platforms" presented at a conference on Machine Learning and Systems (MLSys) in 2020, a data preprocessing pipeline for artificial intelligence (AI) may consume 50% to 60% of the total training time.

In addition, a study entitled "Densely Connected Convolutional Networks" presented at a conference on Computer Vision and Pattern Recognition (CVPR) in 2017 shows that accuracy of a DenseNet model trained by CIFAR-100 datasets increases by at least 3% to 11% when transitioning and mirroring are used as a data augmentation method.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a device with data preprocessing includes a first memory configured to store raw data, and a field programmable gate array (FPGA) in which reconfigurable augmentation modules are programmed, where the FPGA includes a decoder configured to decode the raw data, a second memory configured to store the decoded raw data, and a processor, where the processor is configured to determine target augmentation modules, from among the reconfigurable augmentation modules, based on a data preprocessing pipeline, perform the data preprocessing pipeline using the determined target augmentation modules to generate augmented data, including an augmentation of at least a portion of the decoded raw data stored in the second memory using an idle augmentation module, from among the target augmentation modules, and implement provision of the augmented data to a graphics processing unit (GPU) or Neural Processing Unit (NPU).

The provision of the augmented data may include provision of the augmented data to the GPU.

The processor may be further configured to determine whether the decoded raw data is already present in the second memory from a previous decoding by the decoder, and perform the decoding of the raw data stored in the first memory and the storing of the decoded raw data in the second memory when the determining of whether the decoded raw data is already present in the second memory indicates that the decoded raw data is not already present in the second memory.

The processor may be configured to provide the augmented data to the GPU by a provision of the augmented data to the GPU bypassing a CPU in communication with the GPU.

The device may be a computer that includes the first memory, the FPGA, the GPU, and the CPU, the GPU may be configured to train an AI model using the augmented data as training data, and the CPU may be configured to perform other operations of the computer.

The processor may be configured to perform pipeline parallelization on the data preprocessing pipeline based on the target augmentation modules, receive information associated with an idle state of each of the target augmentation modules, and select plural idle augmentation modules from among the target augmentation modules and augment respective decoded raw data in parallel, according to the performed pipeline parallelization, using the selected plural idle augmentation modules.

The device may further include a third memory configured to store intermediate data generated each time respective decoded raw data is augmented using the selected idle augmentation module.

The processor may be further configured to determine other target augmentation modules, where the other target augmentation modules may correspond to another data preprocessing pipeline different from the data preprocessing pipeline, and perform the other data preprocessing pipeline using the determined other target augmentation modules to generate other augmented data, including another augmentation of corresponding decoded raw data stored in the second memory using another idle augmentation module from among the other target augmentation modules, where the other data processing pipeline may be performed in parallel with the performing of the data processing pipeline.

The target augmentation modules may not overlap with the other target augmentation modules, and the augmented data may not overlap with the other augmented data.

The idle augmentation module may be a same idle augmentation module as the other idle augmentation module, and operation of the idle augmentation module may be divided to perform the augmentation using the idle augmentation module in parallel with the other augmentation using the other idle augmentation module.

The provision of the augmented data may include provision of the augmented data to the NPU.

The processor may be further configured to determine whether the decoded raw data is already present in the second memory from a previous decoding by the decoder, and perform the decoding of the raw data stored in the first memory and the storing of the decoded raw data in the second memory when the determining of whether the decoded raw data is already present in the second memory indicates that the decoded raw data is not already present in the second memory.

The processor may be configured to provide the augmented data to the NPU by a provision of the augmented data to the NPU bypassing a CPU in communication with the NPU.

The device may be a computer that includes the first memory, the FPGA, the NPU, and the CPU, the NPU may be configured to train an AI model using the augmented data as training data, and the CPU may be configured to perform other operations of the computer.

The processor may be configured to perform pipeline parallelization on the data preprocessing pipeline based on the target augmentation modules, receive information associated with an idle state of each of the target augmentation modules, and select plural idle augmentation modules from among the target augmentation modules and augment respective decoded raw data in parallel, according to the performed pipeline parallelization, using the selected plural idle augmentation modules.

The device may further include a third memory configured to store intermediate data generated each time respective decoded raw data is augmented using the selected idle augmentation module.

The processor may be further configured to determine other target augmentation modules, where the other target augmentation modules correspond to another data preprocessing pipeline different from the data preprocessing pipeline, and perform the other data preprocessing pipeline using the determined other target augmentation modules to generate other augmented data, including another augmentation of corresponding decoded raw data stored in the second memory using another idle augmentation module from among the other target augmentation modules, where the other data processing pipeline may be performed in parallel with the performing of the data processing pipeline.

The target augmentation modules may not overlap with the other target augmentation modules.

The idle augmentation module may be a same idle augmentation module as the other idle augmentation module, and operation of the idle augmentation module may be divided to perform the augmentation using the idle augmentation module in parallel with the other augmentation using the other idle augmentation module.

In one general aspect, a processor-implemented method includes decoding raw data stored in a first memory using a decoder of a field programmable gate array (FPGA) in which reconfigurable augmentation modules are programmed, determining target augmentation modules, from among the reconfigurable augmentation modules, based on a data preprocessing pipeline for a training of an AI model, performing the data preprocessing pipeline using the determined target augmentation modules to generate augmented data, including augmenting at least a portion of the decoded data using an idle augmentation module from among the target augmentation modules, providing the augmented data to a graphics processing unit (GPU) or Neural Processing Unit (NPU), and training the AI model by the GPU or the NPU using the provided augmented data as training data.

The decoding of the raw data may include storing the decoded raw data to a second memory, and the performing of the data preprocessing pipeline using the determined target augmentation modules may include performing the augmenting of the at least portion of the decoded raw data stored in the second memory.

In one general aspect, a non-transitory computer-readable storage medium is provided where the non-transitory computer-readable storage medium stores instructions that, when executed by a processor, cause the processor to implement or perform any one, any combination, or all operations and/or methods described herein.

In one general aspect, a processor-implemented method includes performing data preprocessing by determining target augmentation modules configured to perform a data preprocessing pipeline, from among reconfigurable augmentation modules, based on the data preprocessing pipeline, selecting an idle augmentation module from among the target augmentation modules, and generating augmented data by augmenting decoded data using the selected idle augmentation module, and incudes implementing a providing of the augmented data to a graphics processing unit (GPU) or a Neural Processing Unit (NPU).

The method may further include, when the decoded data is be already present in a second memory, decoding raw data stored in a first memory and storing the decoded raw data in the second memory, where the augmenting of the decoded data may include augmenting the decoded raw data stored in the second memory.

The decoding of the raw data stored in the first memory may be performed using a decoder of a field programmable gate array (FPGA), in which the reconfigurable augmentation modules are programmed and the second memory may be disposed.

The implementing of the providing of the augmented data to the GPU or the NPU may include providing the augmented data to the GPU or the NPU by respectively providing the augmented data to the GPU or the NPU bypassing a CPU in respective communication with the GPU or NPU.

The determining of the target augmentation modules configured to perform the data preprocessing pipeline may include performing pipeline parallelization on the data preprocessing pipeline based on the target augmentation modules, and receiving information associated with an idle state of each of the target augmentation modules, and the selecting of the idle augmentation module may include selecting plural idle augmentation modules from among the target augmentation modules and augment respective decoded data in parallel, according to the performed pipeline parallelization, using the selected plural idle augmentation modules.

The method may further include determining other target augmentation modules configured to perform a different other data preprocessing pipeline, from among the reconfigurable augmentation modules, based on the other data preprocessing pipeline, selecting another idle augmentation module from among the other target augmentation modules, and generating other augmented data by other augmenting of corresponding decoded data using the selected other idle augmentation module, where the generating of the augmented data using the selected idle augmentation module for the data preprocessing pipeline may be performed in parallel with the generating of the other augmented data using the other selected idle augmentation module for the other data preprocessing pipeline.

The target augmentation modules may not overlap with the other target augmentation modules, and the augmented data may not overlap with the other augmented data.

The idle augmentation module may be a same augmentation module as the other idle augmentation module, and operation of the idle augmentation module may be divided to perform the augmenting using the idle augmentation module in parallel with the other augmenting using the other idle augmentation module.

The augmenting of the decoded data using the selected idle augmentation module may further include storing intermediate data in a third memory each time respective decoded data may be augmented using the selected idle augmentation module.

The method may further include training an AI model using the GPU based on the augmented data provided to the GPU.

The method may further include training an AI model using the NPU based on the augmented data provided to the NPU.

Other features and aspects will be apparent from the following detailed description, the drawings, and the claims.

Figure 1A:
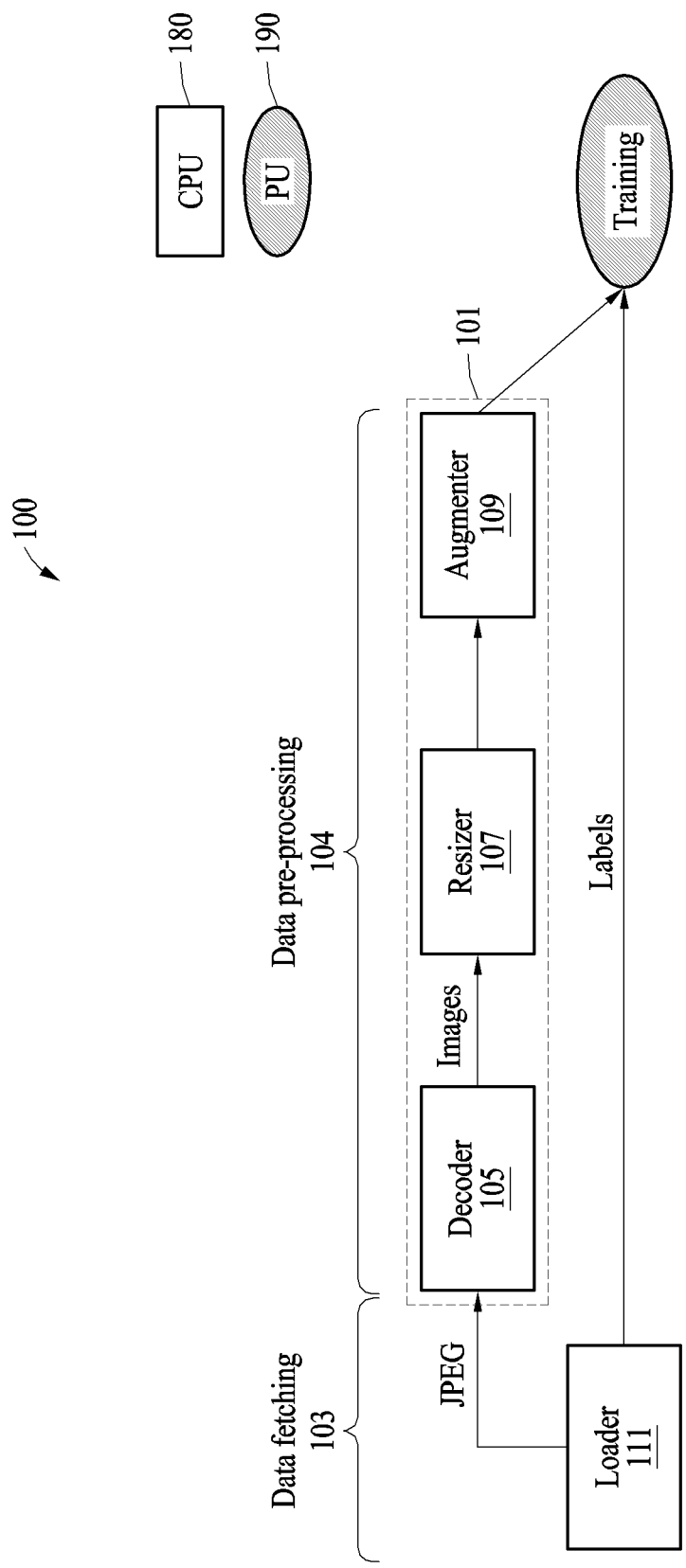
FIG. 1A illustrates an example of data preprocessing for artificial intelligence (AI) training, according to one or more embodiments.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, each of expressions, "between" and "immediately between," for example, and "adjacent to" and "immediately adjacent to," for example, should also be respectively construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all examples are not limited thereto.

A typical image data preprocessing for training a deep neural network (DNN) may include an image being fetched in a form of a JPEG file and preprocessed by a central processing unit (CPU).

For example, a typical preprocessing may include decoding, resizing, and augmentation. The typical augmentation may be a process of increasing data to improve the accuracy for AI training, which may become more important as the typical augmentation occupies an increasing portion of a preprocessing process.

The typical preprocessing is performed by the CPU. However, as the typical data preprocessing process for improving the accuracy of an AI model becomes more complicated, performing such typical CPU-based data processing may be a bottleneck for training high-performance AI models.

For example, a hardware performance of a typical GPU in a single server may be approximately 10 times greater than the typical CPU. Additionally, over time such CPU performances may improve by 1.1 times each year, whereas such GPU performances may improve by 1.5 times each year. Further, as data preprocessed in a CPU is typically learned by or used for training the GPU, a training time may increase irrespective of the GPU performance in a high-performance AI server environment when a delay occurs in a data preprocessing pipeline. For example a data preprocessing process may typically occupies 98% of a total training time in a 256 tensor processing units (TPUs) server based on the same model.

Thus, a GPU- and/or a static field programmable gate array (FPGA)-based data preprocessing method are proposed, e.g., instead of a CPU-based data preprocessing method.

The GPU-based data preprocessing method may determine a portion of a pipeline that is to be moved to a GPU and perform the portion of a data preprocessing process using an idle GPU resource. This method may be effective when the idle resource is present in the GPU, though training performance may decrease when the GPU usage is 80% or more.

The static FPGA-based data preprocessing method may preprocess data preprocessing through fixed data preprocessing modules, each of which are statically or fixedly implemented in an FPGA and through a pipeline. However, the number of methods used for data augmentation may rapidly increase in the future as various new data augmentation algorithms are developed. For example, multiple data augmentation methods may exist in the future, greater than the number of data augmentation methods originally/fixedly supported on a typical/commonly used AI platform. Each typical training task may use a combination of two or more of such data augmentation methods, and thus practically numerous or substantial number of data augmentation pipelines may be present. Thus, it may not be easy to design an FPGA system statically, e.g., at a previous time, with respect to these or future various combinations of data augmentation methods.

Accordingly, in one or more embodiments, an FPGA-based storage device with a dynamically reconfigurable data preprocessing pipeline may be used for data preprocessing, in an example AI server operation of training an AI model. For example, the FPGA-based storage device may dynamically configure the augmentation.

For example, FIG. 1A illustrates an example of data preprocessing for AI training, according to one or more embodiments.

In one or more embodiments, image data preprocessing for training a deep neural network (DNN), as only an example, may be performed by an AI server 100, e.g., by an FPGA-based storage device 101 of the AI server 100, another device, or as a separate storage device 101 device available for such AI training or such use in the AI server or other device. The storage device 101 is discussed in greater detail further below with respect to FIGS. 1B-8. Referring to FIG. 1A, an image may be fetched from a storage of the AI server in a form of a JPEG file, as a non-limiting example, by a loader 111 in operation 103. A label of the image may be transmitted or provided, e.g., by the loader 111, to the GPU for the AI training. Preprocessing of data for the training of an AI model by the AI server, for example, may be performed by the storage device 101 in operation 104 of FIG. 1A.

For example, the preprocessing operation 104 may include decoding by a decoder 105, resizing by a resizer 107, and augmentation by augmenter 109, e.g., where the illustrated decoder 105, resizer 107, and augmenter 109 are components or other hardware modules implemented by the storage device 101. The augmentation may be a process of increasing data to improve the accuracy for the AI training by the AI server 100. Examples of various augmentation methods will be described further below with reference to FIG. 1B, as non-limiting examples.

Additionally, the loader 111, the decoder 105, resizer 107, and augmenter 109 may be respective hardware or any collective hardware of AI server 100, e.g., of the storage device 101, such as different hardware components/modules or any combination of such hardware components/modules or a single hardware component/module. As a non-limiting example, the loader 111 or corresponding fetching may be separate from the storage device 101, as illustrated in FIG. 1A. Any one or any combination of two or more of the loading, decoding, resizing, and augmentation may also be implemented by a combination of hardware components/modules and software, such as where a memory or storage of the AI server, e.g., any memory of or connected to the storage device 101 or the AI server 100, stores instructions, which when executed by one or more processors of the storage device 101, configure the one or more processors to implement or perform the loading and/or implement or perform any one or any combination of two or more of the decoding, resizing, and augmentation operations.

An example FPGA-based storage device will be described in greater detail below with reference to FIG. 2.

Figure 1B:
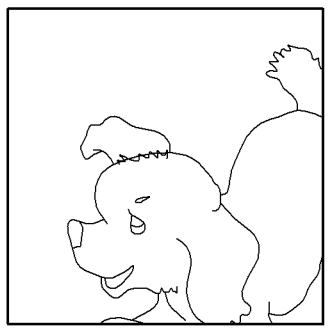
FIG. 1B illustrates an example of augmentation in data preprocessing for AI training, according to one or more embodiments.
Figure 1B:
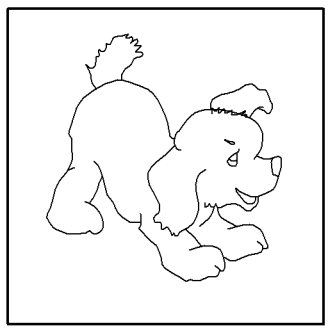
Figure 1B:
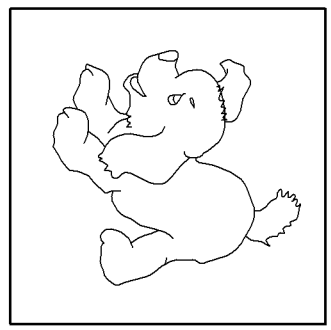
Figure 1B:
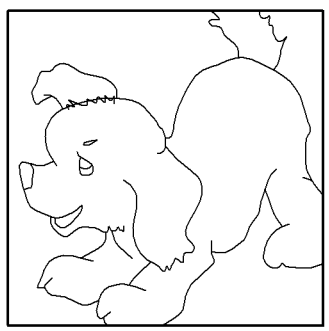
Figure 1B:
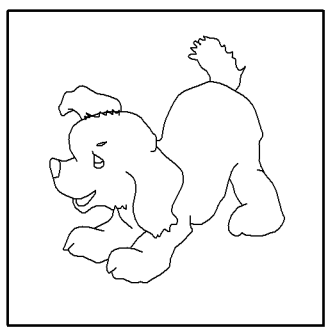
Figure 1B:
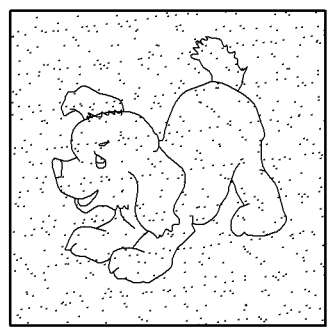
Figure 1B:
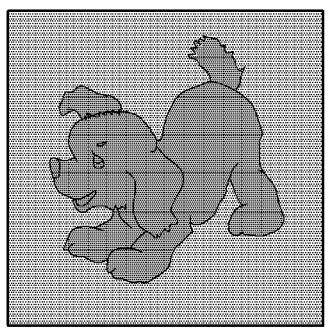
Figure 1B:
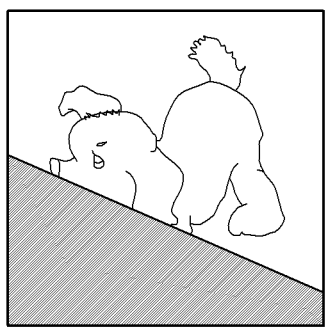
Figure 1B:
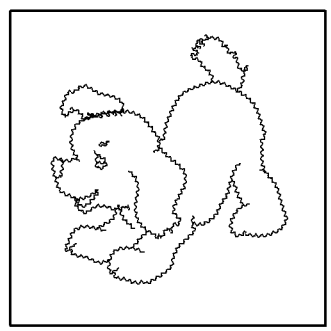

FIG. 1B illustrates an example of augmentation in data preprocessing for AI training, according to one or more embodiments.

In the example of FIG. 1B, an original image and augmented images are illustrated. Example augmentation methods illustrated in FIG. 1B may include, as respective non-limiting examples, the illustrated cropping that partially cuts an image, the illustrated symmetry-based method that horizontally or vertically flips an image, the illustrated rotation that rotates an image, the illustrated scaling that changes a size of an image, the illustrated noising that adds noise to an image, the illustrated a hue-based method that changes a hue of an image, the illustrated obstruction that partially covers an image, and the illustrated blurring that adds a blur to an image.

Various input data may be used for AI training, and the accuracy of a result of AI training may be improved when data obtained by applying various augmentation methods to single original data is input. The augmentation methods illustrated in FIG. 1B are provided merely as examples, there may be additional or other augmentation methods and augmentation modules for performing the augmentation methods, and due to the reconfigurable programmable configuration of the FPGA 140 augmentation modules may be removed, changed, and/or added to the FPGA 140. Such augmentation modules will be described in greater detail below with reference to FIG. 3.

Figure 2:
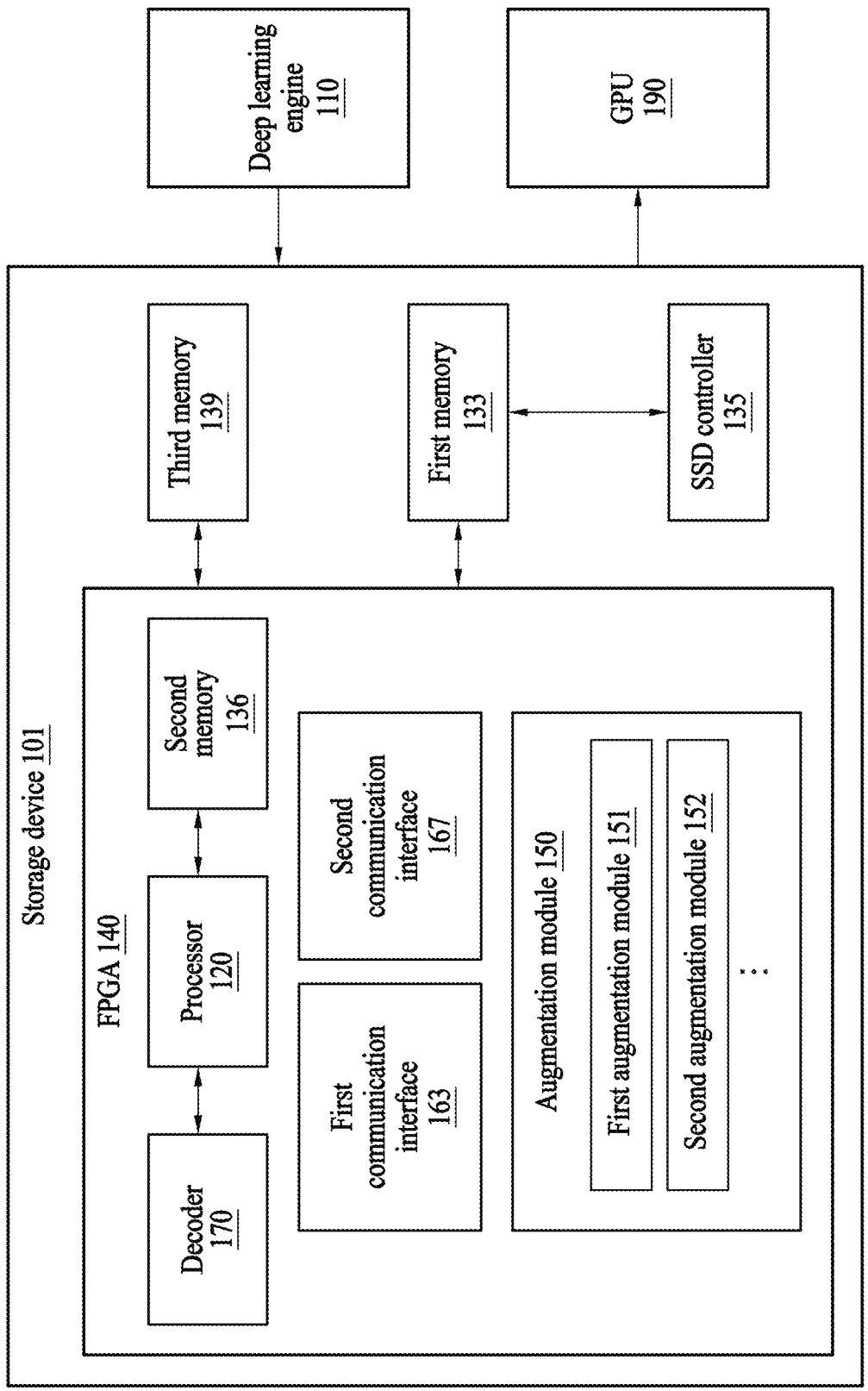
FIG. 2 illustrates an example of a storage device for data preprocessing, according to one or more embodiments.

FIG. 2 illustrates an example of a storage device for data preprocessing, according to one or more embodiments.

Referring to FIG. 2, a storage device 101 may receive a data preprocessing pipeline from a deep learning engine 110 to augment data, and transmit or provide the augmented data to a GPU 190 for AI training. The storage device 101 may be a programmable storage device that includes an FPGA 140, for example, a solid-state drive (SSD). One or more of the storage devices 101 may also be respective components of an AI server 100 configured to perform the AI training.

Thus, the storage device 101 may be a storage device of an AI server 100, e.g., as a non-limiting example deep learning server, and an intelligent storage device that processes data to increase robustness of a training model and actively provides the processed data to the PU 190 (e.g., a Graphics Processing Unit (GPU) or a Neural Processing Unit (NPU)), rather than simply providing the training data in its original form to the PU 190. Briefly, while FIG. 1 illustrates a PU 190, this illustration of PU 190 is representative of the example GPU 190 and the example NPU 190 in alternate examples, for example. Hereinafter, solely for brevity of explanation, embodiments will be discussed with respect to the example where the PU 190 is a GPU 190. Though such embodiment and drawing illustration discussions will be with respect to the example where the PU 190 is the GPU 190, these discussions are also equally applicable to examples where the PU 190 is the NPU 190 and thus an illustrated GPU 190 is also representative of the NPU 190. Data to be preprocessed by the storage device 101 may be, for example, image, sound, or video data, as non-limiting examples.

As the storage device 101, e.g., and not the CPU 180 and/or the GPU 190, is responsible for data preprocessing, the CPU 180 may be maintained available and accordingly used for other deep learning operations, for example, model validation, inference, and big data processing, and the GPU may be used, e.g., solely, for performing training algorithms, e.g., of the training of the AI model based on the transmitted or provided preprocessed data from the storage device 101.

In one example, the storage device 101 may provide data preprocessing improved through an FPGA-based implementation suitable for a workload that needs high-performance training. For example, one or more reconfigurable augmentation modules 150 may be programmed into the FPGA 140, enabling dynamic data augmentation. In one example, the storage device 101 may perform parallelization on a preprocessing process at an SSD level to improve a preprocessing speed. The storage device 101 may remove a redundant operation unnecessary for data decoding and consolidate workloads.

In one example, the storage device 101 may include a first memory 133 configured to store therein raw data to be preprocessed, and an SSD controller 135 configured to control reading and writing of data from and in the first memory 133. The first memory 133 may be a flash memory, as a non-limiting example.

The storage device 101 may also include the FPGA 140. The FPGA 140 may have multiple augmentation modules 150 for performing respective augmentation methods that are programmed therein, and may further include a decoder 170 configured to decode data, a processor 120, and a second memory 136 configured to store therein the decoded data. As a non-limiting example, the processor 120 may be a Micro-Blaze, one of soft microprocessor cores for FPGAs. As another non-limiting example, the processor 120 may be a reduced instruction set computer five (RISC-V). The processor 120 may control data processing and communication between the augmentation modules 150, and control access to a third memory 139 by the FPGA 140.

The second memory 136 may be a block random-access memory (BRAM), as a non-limiting example. The second memory 136 may load data, and temporarily store therein intermediate data without providing or sending the data outside of the corresponding chip, and thus may reduce external data traffic and power consumption.

The storage device 101 may further include the third memory 139. As a non-limiting example, the third memory 139 may be a dynamic random-access memory (DRAM) dedicated to an FPGA, and temporarily store intermediate data performed in the FPGA. For example, intermediate data may be generated in a process using various augmentation modules, and the generated intermediate data may be temporarily stored in the third memory 139. As an example, the processor 120 may use the third memory 139 to prevent an unnecessary operation from being redundantly performed.

The FPGA 140 may include a first communication interface 163 for communication among the processor 120, the augmentation modules 150, the second memory 136, and the third memory 139. As a non-limiting example, the first communication interface 163 may be of an advanced microcontroller bus architecture (AMBA), for example, an advanced eXtensible interface 4 (AXI4), which has a parallel, high-performance, synchronous, high-frequency, multi-master, and multi-slave communication interface and which may provide an optimal protocol through such a multi-slave and multi-master structure.

The FPGA 140 may include a second communication interface 167 for communication with the first memory 133 and the GPU 190. As a non-limiting example, the second communication interface 167 may be a peripheral component interconnect express (PCIe).

In one example, the processor 120 may receive a data preprocessing pipeline from the deep learning engine 110 and determine target augmentation module(s), which is/are to perform the data processing pipeline, from among one or more augmentation modules 150 based on the received data preprocessing pipeline. Various examples of operations of determining such target augmentation module(s) based on a data preprocessing pipeline will be described in greater detail below with reference to FIG. 3.

The processor 120 may determine a state (e.g., an idle state or a busy state) of each of the augmentation modules 150 and augment the decoded data stored in the second memory 136 using an idle augmentation module among the target augmentation modules. Sets of decoded data may be processed in parallel by the augmentation modules 150. Various examples of a data augmentation process will be described in greater detail below with reference to FIGS. 4 and 5.

When the decoded data is not present or available in the second memory 136, the processor 120 may fetch the raw data stored in the first memory 133, decode the data by the decoder 170, and augment the decoded data through the idle augmentation module among the target augmentation modules. The decoded data may be stored in the second memory 136, e.g., so that a decoding process may not be repeatedly performed when the same raw data is subsequently input.

When the decoded data is not present or available in the second memory 136, the processor 120 may refer to the third memory 139 before fetching the raw data from the first memory 133. The third memory 139 may be an FPGA dedicated memory, for example, that temporarily stores various sets of data, and thus an accessing of the third memory 139 by the processor 120 may use less traffic than an accessing of the first memory 133.

The processor 120 may transmit or provide the augmented data to the GPU 190. For example, the augmented data may bypass the CPU 180 (e.g., without performing data augmentation by the CPU 180) through the second communication interface 167 (e.g., a PCIe) and transmitted or provided directly to the GPU 190. In such a case, in an example technologies such as seamless operating system integration of peer-to-peer direct memory access (DMA) between SSDs and GPUs (SPIN) and GPUDirect Storage may be used. As the augmented data is transmitted or provided to the GPU 190, without passing through the CPU 180, the usage of CPU 180 resources may increase for other operations of the CPU 180.

Figure 3:
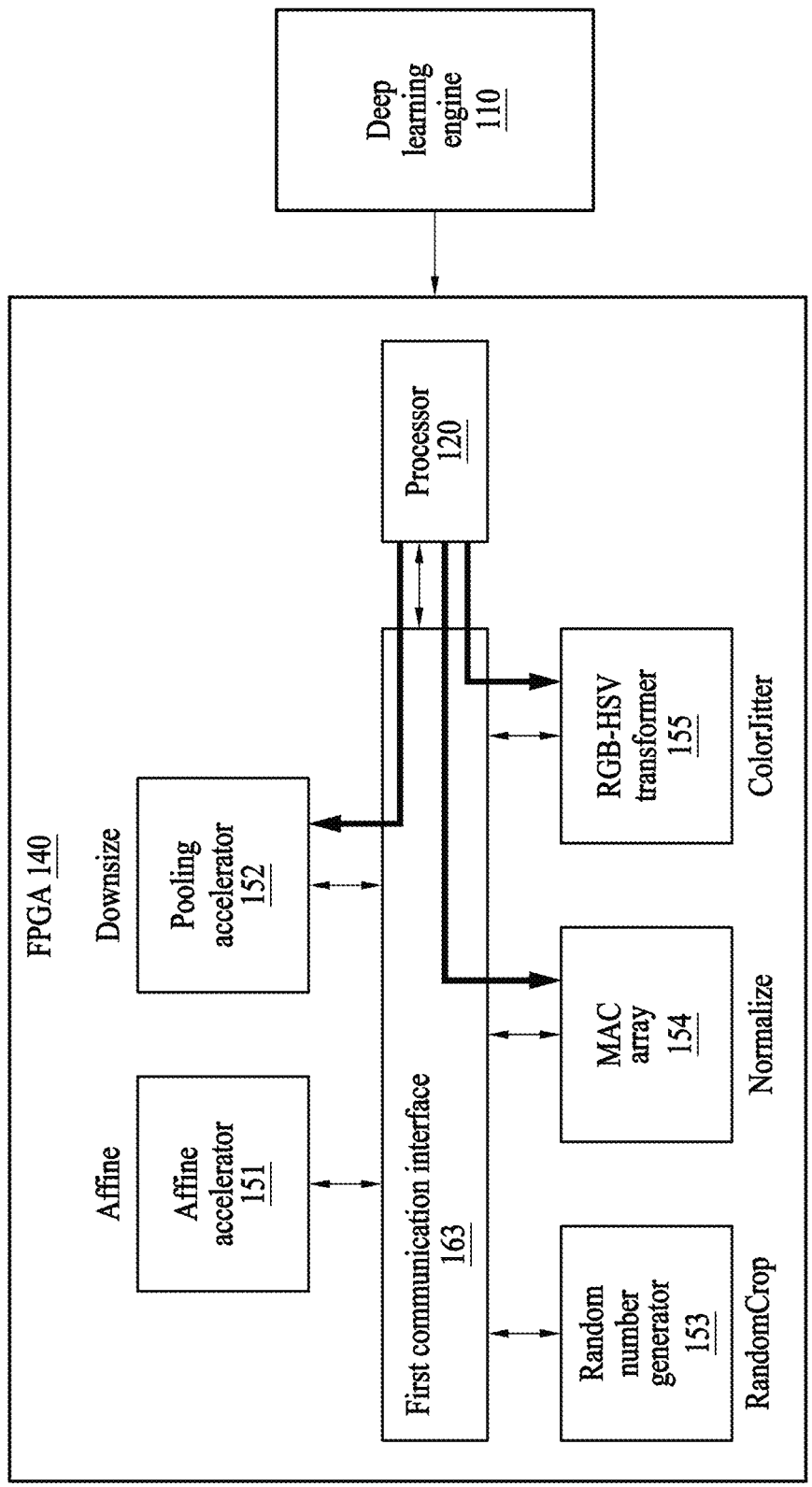
FIG. 3 illustrates an example of determining target augmentation modules among one or more augmentation modules, according to one or more embodiments.

FIG. 3 illustrates an example of determining target augmentation modules among one or more augmentation modules, according to one or more embodiments.

Referring to FIG. 3, the augmentation modules 150 programmed in the FPGA 140 may include various augmentation modules, such as, as a non-limiting example, an affine accelerator 151 configured to perform an affine transformation that changes an overall image shape by changing a layout structure while maintaining pixel values, a pooling accelerator 152 configured to compress and downsize the size of an image, a random number generator 153 configured to perform a random operation (e.g., random image rotation, inversion, or cropping), a multiply-accumulate (MAC) array 154 configured to perform image normalization, and an RGB (red, green, and blue)-HSV (hue, saturation, value) transformer 155 configured to randomly change (e.g., ColorJitter) brightness, contrast, and saturation of an image. However, these augmentation modules are provided as merely example augmentation modules, and other various augmentation modules may be programmed as being reconfigurable in the FPGA 140.

In one example, the processor 120 may receive a pipeline for data preprocessing from the deep learning engine 110 and determine a target augmentation module that is to perform the data preprocessing pipeline from among the augmentation modules 151 through 155. The processor 120 may determine the pooling accelerator 152, the MAC array 154, and the RGB-HSV transformer 155 to be needed to perform the pipeline received from the deep learning engine 110 and determine the pooling accelerator 152, the MAC array 154, and the RGB-HSV transformer 155 as target augmentation modules. Through pipeline parallelization that determines target augmentation modules by analyzing the pipeline received from the deep learning engine 110 without simply processing the pipeline as it is, data may be augmented more rapidly. An example of the pipeline parallelization will be described in greater detail below with reference to FIG. 4.

In an example, the augmentation modules 150 may not perform a subsequent operation until an operation they are currently performing is completed, and thus the processor 120 may verify a state of the target augmentation modules that are to perform a data preprocessing pipeline. For example, the processor 120 may receive, from the augmentation modules 150, information as to whether each module is respectively in an idle or busy state. The information associated with a state of each module may be stored in the second memory 136.

Referring to FIG. 3, the processor 120 may augment decoded data stored in the second memory 136 using idle augmentation modules among the target augmentation modules, for example, the target augmentation modules 152, 154, and 155. As described above with reference to FIG. 2, when the decoded data is not in the second memory 136, the processor 120 may fetch raw data stored in the first memory 133, and augment the data by decoding the raw data by the decoder 170. The decoded data may be stored in the second memory 136, and thus a decoding process may not be repeatedly performed when the same raw data is subsequently input.

For an augmentation operation, the storage device 101 may dynamically configure the various augmentation modules 150 and perform data parallel processing. Various examples of performing data parallel processing in an augmentation process will be described in greater detail below with reference to FIGS. 4 and 5.

Figure 4:
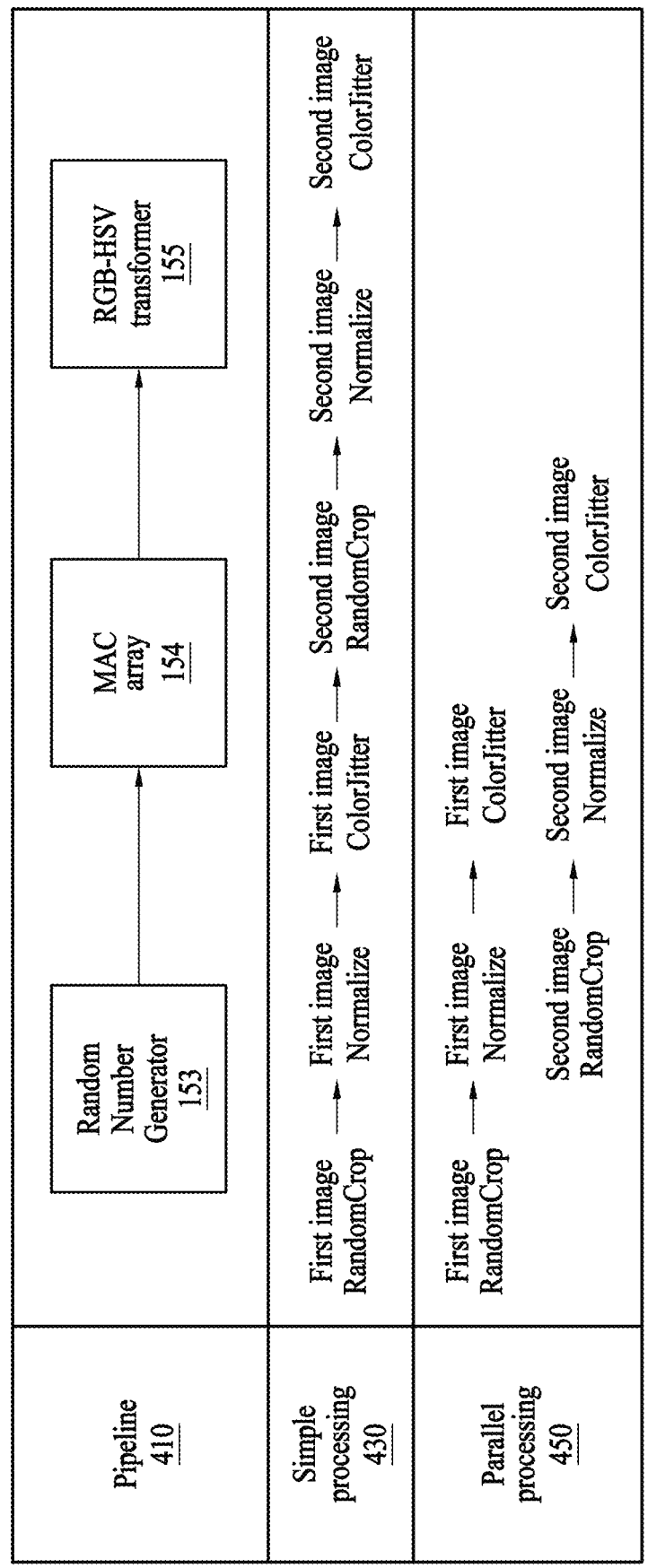
FIG. 4 illustrates an example of operations of parallel processing during data preprocessing based on a single pipeline, according to one or more embodiments.

FIG. 4 illustrates an example of operations of parallel processing during data preprocessing based on a single pipeline, according to one or more embodiments.

Referring to FIG. 4, data parallel processing may be performed through pipeline parallelization on one pipeline received from the deep learning engine 110.

In one example, for a single pipeline received from the deep learning engine 110, target augmentation modules and a processing order may be determined as described above with reference to FIG. 3. Referring to FIG. 4, a pipeline 410 that is based on target augmentation modules and a processing order may be determined to be in an order of the random number generator 153, the MAC array 154, and the RGB-HSV 155, which starts from the random number generator 153.

A comparison between a case of simple processing 430 using a pipeline received from the deep learning engine 110 and a case of parallel processing 450 through pipeline parallelization will be described hereinafter with reference to FIG. 4. For example, data to be augmented in the storage device 101 may include a first image and a second image.

In the case of the simple processing 430 using the pipeline received from the deep learning engine 110 without a change, the first image may be processed first and the second image may then be processed based on the received pipeline. That is, the first image may be first processed, and the second image may then be processed without parallelization of the target augmentation modules 153, 154, and 155. Thus, as illustrated in FIG. 4, the first image may be processed through random cropping, normalization, and color jitter, and then the second image may be processed through random cropping, normalization, and color jitter.

In the case of data parallel processing 450 after the target augmentation modules 153, 154, and 155 are determined and the pipeline parallelization is performed, the first image and the second image may be processed in parallel based on the target modules 153, 154, and 155. That is, the first image may be first processed, and the second image may then be processed for each of the target augmentation modules 153, 154, and 155, i.e., as a 'staggered parallelization'.

For example, in a case in which the first image is processed through random cropping, normalization, and color jitter as illustrated in FIG. 4, the image may be processed by each of the target augmentation modules 153, 154, and 155, and thus the random number generator 153 may come into an idle state after completing random cropping on the first image and perform random cropping on the second image even before an entire augmentation process for the first image is completed. That is, while normalization is being performed on the first image in the MAC array 154, random cropping may be concurrently performed in the random number generator 153.

In one example, information associated with each augmentation module may be transmitted or provided to the processor 120, and the processor 120 may augment data using the information. However, data processing may not be started when all target modules for performing a pipeline are in an idle state. For example, in the case of the parallel processing 450, when normalization is performed on the first image during augmentation of the first image, the MAC array 154 that performs the normalization may be in a busy state, whereas the random number generator 153 and the RGB-HSV transformer 155 may be in an idle state. The second image to be processed after the first image may need to be processed first through random cropping by the random number generator 153, and thus the processor 120 may perform the random cropping on the second image using the random number generator 153 because the random number generator 153 that performs the random cropping is idle even though the MAC array 154 is busy among the target augmentation modules 153, 154, and 155. That is, even when entire augmentation for the first image is not completed, augmentation for the second image may be started.

In one example, intermediate data from various target augmentation modules, for example, the target augmentation modules 153, 154, and 155, may be stored in the third memory 139. The third memory 139 may be an FPGA dedicated memory, and the processor 120 may store the intermediate data in the third memory 139, which is more accessible than the first memory 133, and use the stored data. For example, the processor 120 may process the first image using the random number generator 153 in a process of augmenting the first image based on the pipeline 410, and store a randomly cropped first image obtained through the random cropping in the third memory 139. In this example, when the processor 120 receives another pipeline afterwards and determines that the first image needs to again be randomly cropped, rather than again performing the random cropping of the first image the processor 120 may fetch the randomly cropped first image stored in the third memory 139, i.e., without processing the first image using the random number generator 153.

In one example, pipeline parallelization may be used to improve a data augmentation speed, and an effect of improving the speed by the parallel processing may increase as a pipeline received from the deep learning engine 110 is complex and long.

Figure 5:
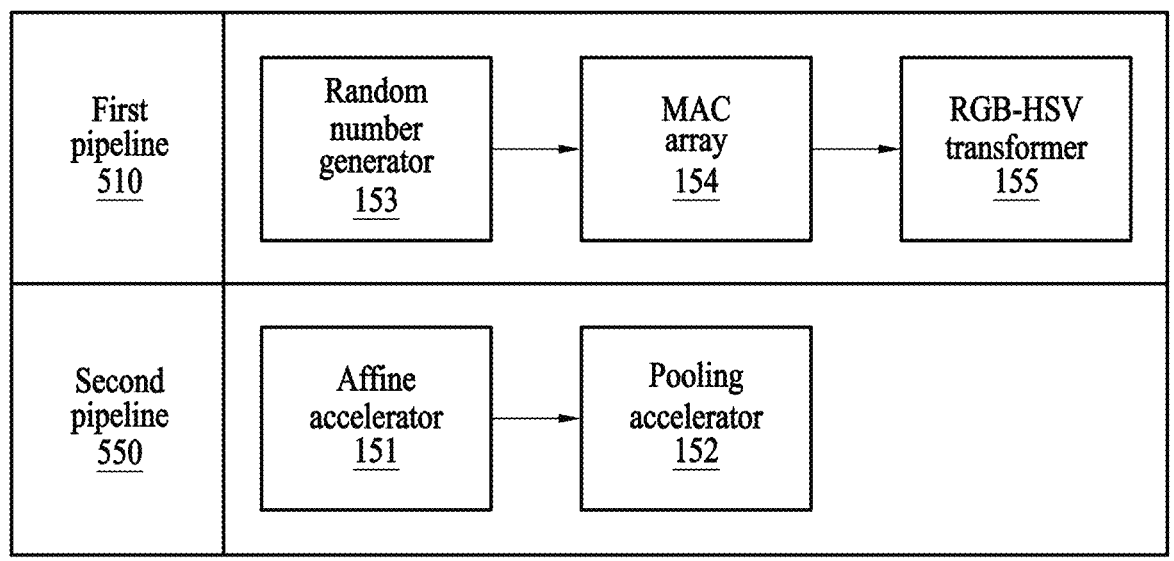
FIG. 5 illustrates an example of operations of parallel processing during data preprocessing based on a plurality of pipelines, according to one or more embodiments.

FIG. 5 illustrates an example of operations of parallel processing during data preprocessing based on a plurality of pipelines, according to one or more embodiments.

In the FIG. 5, illustrated is multiple pipeline-based parallel processing, which is a higher level of parallel processing than single pipeline-based parallel processing described with reference to FIG. 4 that is performed in a process of processing an image by receiving a single pipeline.

As described above with reference to FIG. 2, a method of preprocessing data through data preprocessing modules implemented statically in an FPGA and a pipeline may not dynamically perform various data augmentation methods. For example, as illustrated in FIG. 5, when there are a first pipeline 510 processed in an order of the random number generator 151, the MAC array 154, and the RGB-HSV transformer 155, starting from the random number generator 151, and a second pipeline 550 processed in an order of the affine accelerator 151 and the pooling accelerator 152 starting from the affine accelerator 151, a statically implemented FPGA-based storage device cannot simultaneously perform both the pipelines because the storage device needs to be designed suitably for a pipeline.

In one example, various augmentation modules may be programmed in the storage device 101 and sets of data may be dynamically processed by the processor 120, and it is thus possible to process various pipelines unlike the statically designed FPGA-based storage device.

The processor 120 of the storage device 101 may receive different pipelines from the deep learning engine 110, determine target modules, and configure the first pipeline 510 and the second pipeline 520 with the target modules to perform parallel processing on data. Referring to FIG. 5, target augmentation modules used in the first pipeline 510 and the second pipeline 550 may be different for the first pipeline 510 and the second pipeline 550, and thus the processor 120 may augment images based on respective target modules corresponding to the first pipeline 510 and the second pipeline 520.

Although the target augmentation modules (e.g., the target augmentation modules 153, 154, and 155) used in the first pipeline 510 and the target augmentation modules (e.g., the target augmentation modules 151 and 152) used in the second pipeline 550 are illustrated such that there is no overlapping of these target augmentation modules between pipelines, examples are not limited thereto. For example, according to examples, there may be overlapping target augmentation modules between pipelines determined based on target modules from pipelines received from the deep learning engine 110. For example, the affine accelerator 151 that performs an affine transformation may be an overlapping target module between the pipelines. However, even though there is an overlapping target module, the target module may operate when it is in an idle state. In this example, the affine accelerator 151 which is the overlapping target module may be in a busy state while processing an image based on the first pipeline 510 and then come into an idle state after completing an affine transformation among operations based on the first pipeline 510. As described above with reference to FIG. 3, the processor 120 may receive respective information associated with a state of each of the augmentation modules 150 and perform an affine transformation among operations based on the second pipeline 520 using the affine accelerator 151 when it comes into an idle state.

In one example, when an overlapping augmentation process is needed for different pipelines, target augmentation modules may be used for each of the pipelines. For example, when both the first pipeline 510 and the second pipeline 520 include an affine transformation, an affine accelerator that performs the affine transformation may be divided into a first affine accelerator used for the first pipeline 510 and a second affine accelerator used for the second pipeline 520.

In one example, when target modules performing the same augmentation process are present in corresponding pipelines based on the pipelines and a computation amount differs for each of the target modules, the processor 120 may share the target modules between the pipelines for processing. For example, the first pipeline 510 and the second pipeline 520 may both perform an affine transformation, and the first pipeline 510 may use the first affine accelerator and the second pipeline 520 may use the second affine accelerator. Additionally, in an example, when the first affine accelerator has an excessive amount of computation and the second affine accelerator is in an idle state, the processor 120 may also use the second affine accelerator for the affine transformation in the first pipeline 510.

Figure 6:
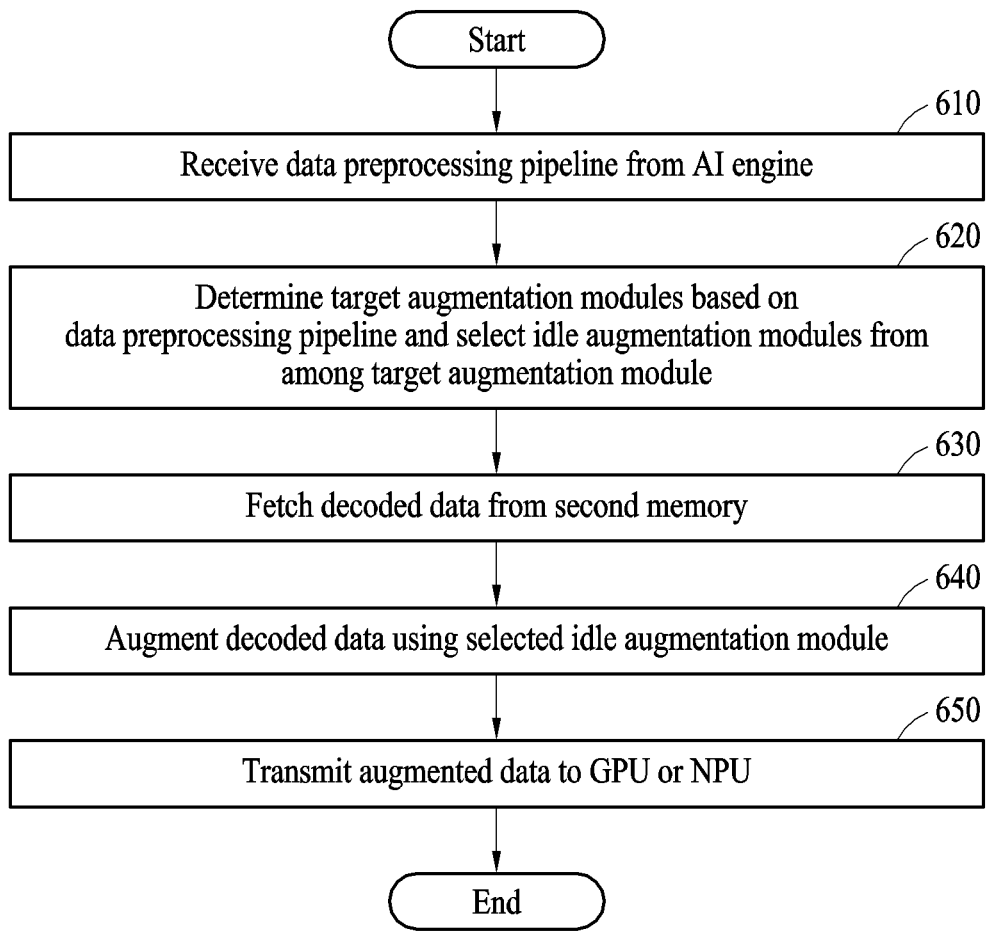
FIG. 6 illustrates an example of a method of operating a storage device, according to one or more embodiments.

FIG. 6 illustrates an example of a method of operating a storage device, according to one or more embodiments.

Operations 610 through 650 to be described hereinafter with reference to FIG. 6 may be performed by the processor 120 of the FPGA-based storage device 101 described above with reference to FIG. 2, as a non-limiting example. Though applicable, detailed and repeated description of the operations already discussed with reference to FIGS. 1 through 5 may be omitted below for brevity purposes.

In operation 610, the processor 120 may receive a data preprocessing pipeline from an AI engine, for example, the deep learning engine 110. The data preprocessing pipeline may include information as to which augmentation modules are to be used in what order to augment raw data stored in the first memory 133 of the storage device 101.

In operation 620, the processor 120 may select an idle augmentation module based on the data preprocessing pipeline. In the FPGA 140 of the FPGA-based data processing storage device 101, various reconfigurable augmentation modules may be programmed. As described above with reference to FIG. 3, the processor 120 may determine target augmentation modules to augment the raw data based on the pipeline. Various examples of selecting an idle augmentation module will be described in greater detail below with reference to FIG. 7.

In operation 630, the processor 120 may fetch decoded data from the second memory 136. When the decoded data is not present in the second memory 136, the processor 120 may verify whether the raw data is present by referring to the third memory 139. When the raw data is not present in the third memory 139 as well, the processor 120 may fetch the raw data from the first memory 133 and perform decoding on the raw data using the decoder 170. Various examples of fetching decoded data will be described in greater detail below with reference to FIG. 8.

In operation 640, the processor 120 may augment the decoded data using the idle augmentation module. The idle augmentation module selected in operation 620 may be used, and the processor 120 may temporarily store intermediate data in the third memory 139 when each augmentation module performs an augmentation process. As described above with reference to FIG. 4, as the processor 120 stores the intermediate data in the third memory 139, a data preprocessing efficiency of data preprocessing may be improved.

In operation 650, the processor 120 may transmit or provide the augmented data to the GPU 190. As described above with reference to FIG. 2, the augmented data may be transmitted or provided to the GPU 190 without passing through a CPU 180, and thus the usage of CPU resources may be improved.

Figure 7:
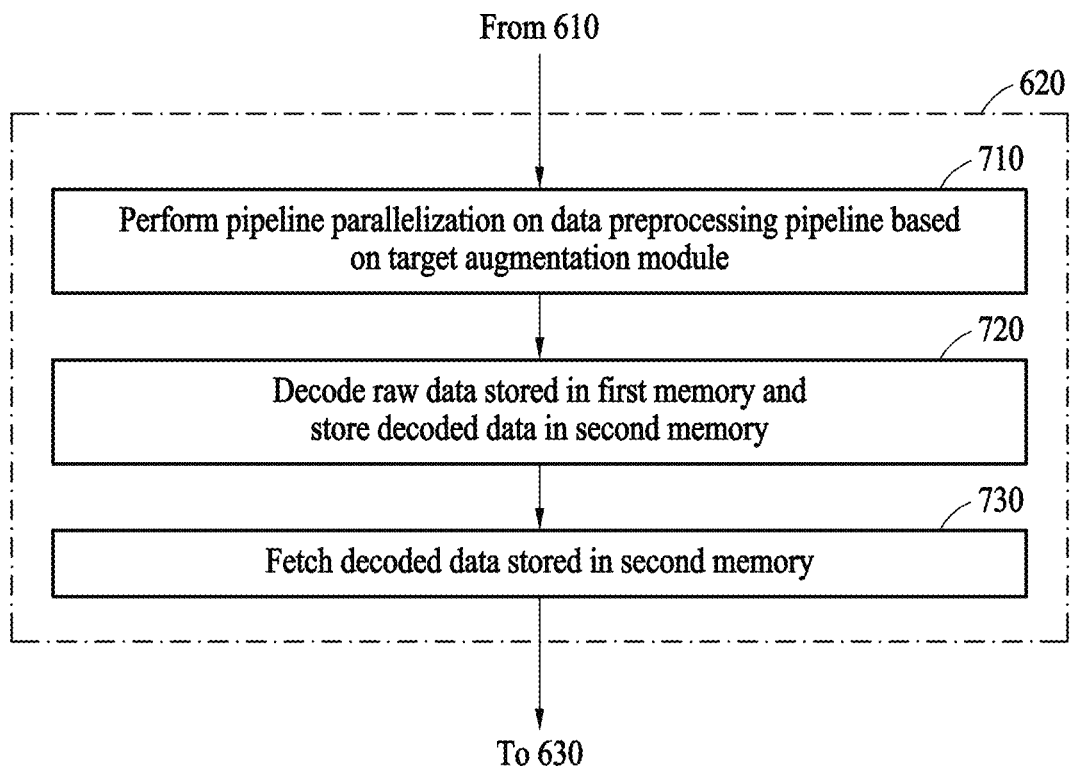
FIG. 7 illustrates an example of selecting idle augmentation modules based on a data preprocessing pipeline, according to one or more embodiments.

FIG. 7 illustrates an example of selecting idle augmentation modules based on a data preprocessing pipeline, according to one or more embodiments.

Operations 710 through 730 to be described hereinafter with reference to FIG. 7 may be performed by the processor 120 of the FPGA-based storage device 101 described above with reference to FIG. 2, as a non-limiting example. For example, operations 710 through 730 may correspond to an operation of selecting an idle augmentation module based on a data preprocessing pipeline, e.g., operation 620 in FIG. 6 may be performed by operations 710 through 730.

In operation 710, the processor 120 may perform pipeline parallelization based on target augmentation modules. As described above with reference to FIGS. 3 through 5, the processor 120 may analyze a data preprocessing pipeline received from the deep learning engine 110, determine target augmentation modules needed to perform the pipeline, and determine a processing order of the augmentation modules.

In operation 720, the processor 120 may receive information associated with an idle state of each of the target augmentation modules. As described above with reference to FIG. 2, the processor 120 may receive information associated with states of the augmentation modules through the first communication interface 163.

In operation 730, the processor 120 may select an idle augmentation module from among the target augmentation modules in an idle state. Referring to FIG. 7, operation 730 may be included in operation 620 in FIG. 6, and is illustrated as being performed before an operation of augmenting decoded data using a selected idle augmentation module, for example, operation 640 in FIG. 6. However, examples may not be limited thereto. That is, the information associated with the state of each module may be transmitted or provided to the processor 120, and thus the processor 120 may only use an augmentation module in an idle state to augment the decoded data based on the target augmentation modules determined based on the pipeline and the processing order. The augmentation process may not be started when all the target augmentation modules are in an idle state as described above with reference to FIG. 4.

Figure 8:
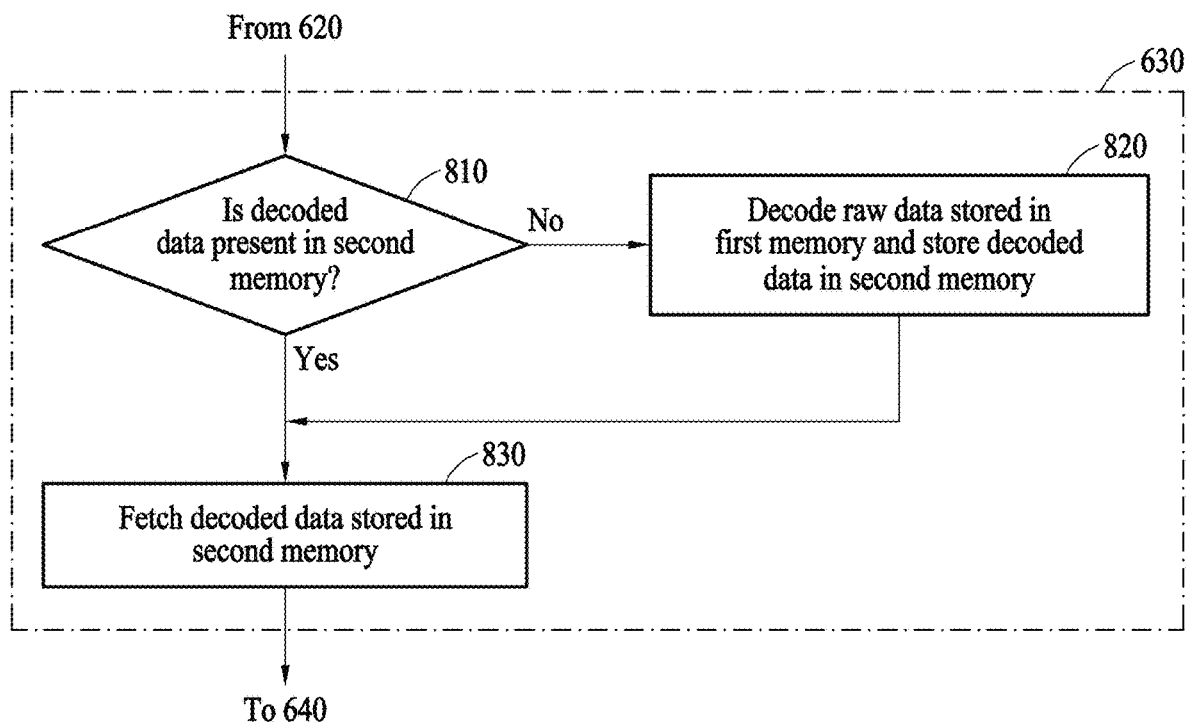
FIG. 8 illustrates an example of fetching decoded data, according to one or more embodiments.

FIG. 8 illustrates an example of fetching decoded data, according to one or more embodiments.

Operations 810 through 830 to be described hereinafter with reference to FIG. 8 may be performed by the processor 120 of the FPGA-based storage device 101 described above with reference to FIG. 2, as a non-limiting example. Operations 810 through 830 may correspond to an operation of fetching the decoded data from ae second memory, for example, operation 630 in FIG. 6.

In operation 810, the processor 120 may verify whether decoded data is present or available by referring to the second memory 136.

In operation 820, the processor 120 may decode raw data stored in the first memory 133 and store the decoded data in the second memory 136 when the decoded data is not present in the second memory 136. Although it is illustrated in FIG. 8 that the raw data is decoded and stored in the second memory 136 in operation 820 and the decoded data stored in the second memory 136 is fetched in operation 830 for the convenience of description, examples are not limited thereto. For example, the processor 120 may fetch the decoded data from the second memory 136 before storing the data in the second memory 136 and augment the fetched data in operation 640.

As described above with reference to FIG. 2, when the decoded data is not present or available in the second memory 136 in operation 810, the processor 120 may verify whether the raw data is present or available in the third memory 139 before retrieving the raw data from the first memory 133. The third memory 139 may be an FPGA dedicated memory, allowing the processor 120 to consume less traffic to access the third memory 139, than accessing the first memory 133.

In operation 830, the processor 120 may fetch the decoded data stored in the second memory 136 when the decoded data is not present or available in the second memory 136. The data fetched through operations 810 through 830 may be augmented and transmitted or provided to the GPU 190 in an example AI training by the AI server 100.

The storage device, the loaders, the decoders, the resizers, the augmenters, the CPUs, the GPUs, the tensor processing units, the neural processing units, the deep learning engines, the storage devices, the FPGAs, the processors, the first memories, the second memories, the third memories, the SSD controllers, the first communication interfaces, the second communication interfaces, the augmentation modules, including the first augmentation module, second augmentation module, etc., such as the affine accelerators, the pooling accelerators, the random number generators, the MAC arrays, and the RGB-HSV transformers, divided augmentation modules, and the AI server configured to train an AI model based on results of the augmentations, as non-limiting examples, and other apparatuses, devices, units, modules, and components described herein with respect to FIGS. 1A-8 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1A-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A storage device with data preprocessing, comprising:
a first memory configured to store raw data; and
a field programmable gate array (FPGA) in which reconfigurable augmentation modules are programmed, where the FPGA includes a decoder configured to decode the raw data, a second memory configured to store the decoded raw data, and a processor,
wherein the processor is configured to:
determine target augmentation modules, from among the reconfigurable augmentation modules, based on a data preprocessing pipeline;
receive information associated with an idle state of each of the determined target augmentation modules:
select an idle augmentation module, from among the determined target augmentation modules;
perform the data preprocessing pipeline using the determined target augmentation modules to generate augmented data, including an augmentation of at least a portion of the decoded raw data stored in the second memory using the idle augmentation module in parallel with the determined target augmentation modules; and
implement provision of the augmented data to a graphics processing unit (GPU) or Neural Processing Unit (NPU).

2. The storage device of claim 1, wherein the processor is further configured to:
determine whether the decoded raw data is already present in the second memory from a previous decoding by the decoder; and
perform the decoding of the raw data stored in the first memory and the storing of the decoded raw data in the second memory when the determining of whether the decoded raw data is already present in the second memory indicates that the decoded raw data is not already present in the second memory.

3. The storage device of claim 1, wherein the processor is configured to provide the augmented data to the GPU or the NPU by a provision of the augmented data to the GPU or the NPU bypassing a CPU in communication with the GPU or the NPU.

4. The storage device of claim 1, wherein the processor is configured to:
perform pipeline parallelization on the data preprocessing pipeline based on the target augmentation modules;
receive information associated with an idle state of each of the target augmentation modules; and
select plural idle augmentation modules from among the target augmentation modules and augment respective decoded raw data in parallel, according to the performed pipeline parallelization, using the selected plural idle augmentation modules.

5. The storage device of claim 1, further comprising a third memory configured to store intermediate data generated each time respective decoded raw data is augmented using the selected idle augmentation module.

6. The storage device of claim 1, wherein the processor is further configured to:
determine other target augmentation modules, where the other target augmentation modules correspond to another data preprocessing pipeline different from the data preprocessing pipeline; and
perform the other data preprocessing pipeline using the determined other target augmentation modules to generate other augmented data, including another augmentation of corresponding decoded raw data stored in the second memory using another idle augmentation module from among the other target augmentation modules,
wherein the other data processing pipeline is performed in parallel with the performing of the data processing pipeline.

7. The storage device of claim 6, wherein the target augmentation modules do not overlap with the other target augmentation modules, and the augmented data does not overlap with the other augmented data.

8. The storage device of claim 6, wherein the idle augmentation module is a same idle augmentation module as the other idle augmentation module, and operation of the idle augmentation module is divided to perform the augmentation using the idle augmentation module in parallel with the other augmentation using the other idle augmentation module.

9. A processor-implemented method, comprising:
decoding raw data stored in a first memory using a decoder of a field programmable gate array (FPGA) in which reconfigurable augmentation modules are programmed;
determining target augmentation modules, from among the reconfigurable augmentation modules, that is to perform a data preprocessing pipeline for a training of an AI model;
receiving information associated with an idle state of each of the determined target augmentation modules;
selecting an idle augmentation module, from among the determined target augmentation modules:
performing the data preprocessing pipeline using the determined target augmentation modules to generate augmented data, including augmenting at least a portion of the decoded data using the idle augmentation module in parallel with the determined target augmentation modules;
providing the augmented data to a graphics processing unit (GPU) or Neural Processing Unit (NPU); and
training the AI model by the GPU or the NPU using the provided augmented data as training data.

10. The method of claim 9, wherein the decoding of the raw data includes storing the decoded raw data to a second memory, and
wherein the performing of the data preprocessing pipeline using the determined target augmentation modules includes performing the augmenting of the at least portion of the decoded raw data stored in the second memory.

11. A non-transitory computer-readable storage medium storing instructions that, when executed by a processor, cause the processor to implement or perform the method of claim 9.

12. A processor-implemented method, the method comprising:
performing data preprocessing by:
selecting, from among reconfigurable processors, target processors to perform data preprocessing based on the data preprocessing pipeline;
receiving information associated with an idle state of each of the target processors;
during the performance of the data preprocessing, determining an idle processor from among the target processors and augmenting decoded data using the determined idle processor in parallel with the determined target processors; and generating augmented data by augmenting decoded data using the selected idle processor; and implementing a providing of the augmented data to a graphics processing unit (GPU) or a Neural Processing Unit (NPU).

13. The method of claim 12, further comprising, when the decoded data is not already present in a second memory, decoding raw data stored in a first memory and storing the decoded raw data in the second memory, wherein the augmenting of the decoded data includes augmenting the decoded raw data stored in the second memory.

14. The method of claim 13, wherein the decoding of the raw data stored in the first memory is performed using a decoder of a field programmable gate array (FPGA), in which the reconfigurable processors are programmed and the second memory is disposed.

15. The method of claim 12, wherein the implementing of the providing of the augmented data to the GPU or the NPU comprises:

providing the augmented data to the GPU or the NPU by respectively providing the augmented data to the GPU or the NPU bypassing a CPU in respective communication with the GPU or NPU.

16. The method of claim 12, wherein the selecting of the target processors comprises:

performing pipeline parallelization on the data preprocessing pipeline based on the target processors; and receiving information associated with an idle state of each of the target processors, and wherein the selecting of the idle processor includes selecting plural idle processors from among the target processors and augment respective decoded data in parallel, according to the performed pipeline parallelization, using the selected plural idle processors.

17. The method of claim 12, further comprising:

determining other target processors configured to perform a different other data preprocessing pipeline, from among the reconfigurable processors, based on the other data preprocessing pipeline;

selecting another idle processor from among the other target processors; and generating other augmented data by other augmenting of corresponding decoded data using the selected other idle processor, wherein the generating of the augmented data using the selected idle processor for the data preprocessing pipeline is performed in parallel with the generating of the other augmented data using the other selected idle processor for the other data preprocessing pipeline.

18. The method of claim 17, wherein the target processors do not overlap with the other target processors, and the augmented data does not overlap with the other augmented data.

19. The method of claim 17, wherein the idle processor is a same processor as the other idle augmentation processor, and operation of the idle augmentation processor is divided to perform the augmenting using the idle augmentation processor in parallel with the other augmenting using the other idle augmentation processor.

20. The method of claim 12, wherein the augmenting of the decoded data using the selected idle augmentation processor further comprises:

storing intermediate data in a third memory each time respective decoded data is augmented using the selected idle augmentation processor.

21. The method of claim 12, further comprising training an AI model using the GPU based on the augmented data provided to the GPU.

22. The method of claim 12, further comprising training an AI model using the NPU based on the augmented data provided to the NPU.

23. A non-transitory computer-readable storage medium storing instructions that, when executed by a processor, cause the processor to implement or perform the method of claim 12.

* * * * *